(12) United States Patent
Corrigan et al.

(10) Patent No.: US 6,202,088 B1
(45) Date of Patent: Mar. 13, 2001

(54) CABLE COMMUNICATION SYSTEM AND METHOD FOR MANAGEMENT

(75) Inventors: Richard J. Corrigan, Schaumburg; Frank Pennypacker, Arlington Heigths; Eva Labowicz, Elk Grove Village; Vladimir Dvorkin, Arlington Heights; James A. Fisher, Schaumburg; Jonas Butvila, LaGrange Park, all of IL (US)

(73) Assignee: Motorola Inc., Schaumburg, IL (US)

( * ) Notice: Subject to any disclaimer, the term of this patent is extended or adjusted under 35 U.S.C. 154(b) by 0 days.

(21) Appl. No.: 08/615,371

(22) Filed: Mar. 14, 1996

(51) Int. Cl.[7] ....................................................... H04N 7/10
(52) U.S. Cl. ................................. 709/217; 348/6; 348/12
(58) Field of Search ................................. 348/6, 7, 8, 10, 348/12, 13; 435/3.1, 4.1, 4.2, 6.1, 6.2; 709/217–219

(56) References Cited

U.S. PATENT DOCUMENTS

| | | |
|---|---|---|
| 5,003,591 * | 3/1991 | Kauffman et al. ...................... 348/10 |
| 5,042,062 | 8/1991 | Lee et al. . |
| 5,255,086 * | 10/1993 | McMullan, Jr. et al. . |
| 5,487,066 | 1/1996 | McNamara et al. . |

* cited by examiner

*Primary Examiner*—Nathan Flynn
(74) *Attorney, Agent, or Firm*—Terri S. Hughes; Romi N. Bose

(57) ABSTRACT

A cable communication system (100) where a control unit (110) sends operation parameters to subscriber units (130) and the subscriber units (130) respond by modifying the method of communication. Also, the subscriber units (130) send messages which include information on the subscriber unit (130) and the capabilities of the subscriber unit (130). Furthermore, the control unit (110) efficiently manages the system 100 by monitoring the capabilities and instructing the subscriber units (130) on-how to communicate on the system (100). Such management allows for the migration of subscriber units (170) from one service area (140) to another (190) without the disruption of service. In addition, initialization of subscriber units (130) may be accomplished over the cable and does not require an operator at the subscriber location.

4 Claims, 7 Drawing Sheets

*500*

| BITS | | | | | | | | RELATIVE |
|---|---|---|---|---|---|---|---|---|
| 8 | 7 | 6 | 5 | 4 | 3 | 2 | 1 | OCTET |
| CARRIER PROFILES<br>INFORMATION ELEMENT IDENTIFIER | | | | | | | | 1 |
| 0 | 0 | 0 | 1 | 0 | 0 | 0 | 0 | |
| LENGTH OF CARRIER PROFILES IE | | | | | | | | 2 |
| CARRIER PROFILE DESCRIPTION | | | | | | | | 3 |
| | | | | | | | | 4 |
| | | | | | | | | 5 |
| (REPEAT AS NEEDED) | | | | | | | | N |

| BITS | | | | | | | | RELATIVE |
|---|---|---|---|---|---|---|---|---|
| 8 | 7 | 6 | 5 | 4 | 3 | 2 | 1 | OCTET |
| PARAMETER VALUES<br>INFORMATION ELEMENT IDENTIFIER | | | | | | | | 1 |
| 0 | 1 | 0 | 0 | 0 | 0 | 0 | 1 | |
| LENGTH OF PARAMETER VALUES IE | | | | | | | | 2 |
| PARAMETER DESCRIPTION | | | | | | | | 3 |
| | | | | | | | | 4 |
| | | | | | | | | 5 |
| | | | | | | | | 6 |
| | | | | | | | | 7 |
| (REPEAT AS NEEDED) | | | | | | | | N |

*FIG.6*

CABLE COMMUNICATION SYSTEM AND METHOD FOR MANAGEMENT

BACKGROUND

The present invention relates, in general, to communication systems, and more particularly to management of service in cable communication systems.

Cable communication systems are being designed to handle a wide variety of services including telephony, broadcast television, video phones and large bandwidth data. One way of integrating these services is by using a system similar to present cable television systems. However, new methods must be used in order to efficiently use resources such as bandwidth while still supplying the customer with acceptable service and meeting the additional requirements of a two-way communication system.

Typical cable television systems have fixed subscriber groups (such as a neighborhood of households) that are associated with certain particular transceivers at the cable plant headend. These subscriber groups are sometimes referred to as service area groups. Systems such as these, however, have several drawbacks. For instance, service will be interrupted if the headend transceivers or subscriber units must be regrouped or reorganized. For example, if the number of subscribers is changed and groups must be modified, service will likely be interrupted to at least some of the existing subscribers. This is unacceptable for services such as telephony.

Also, existing cable television systems have the drawback of typically requiring an operator to configure the cable television set-top box at the customer location. In existing cable television systems, security and authentication information is typically entered at the manufacturing facility or the customer location. Initialization of the cable television set top box requires the operator to enter information at the subscriber location.

Therefore, there exists a need for a flexible system that can be efficiently managed that allows for remotely configuring subscriber units and reorganizing service area groups (also refereed to as migrating subscriber units) without the disruption of service.

BRIEF DESCRIPTION OF THE DRAWINGS

FIG. 5 is block diagram of a frequency bandwidth parameter;

FIG. 6 is a block diagram of security identification parameter;

DETAILED DESCRIPTION OF THE DRAWINGS

Figure 1:
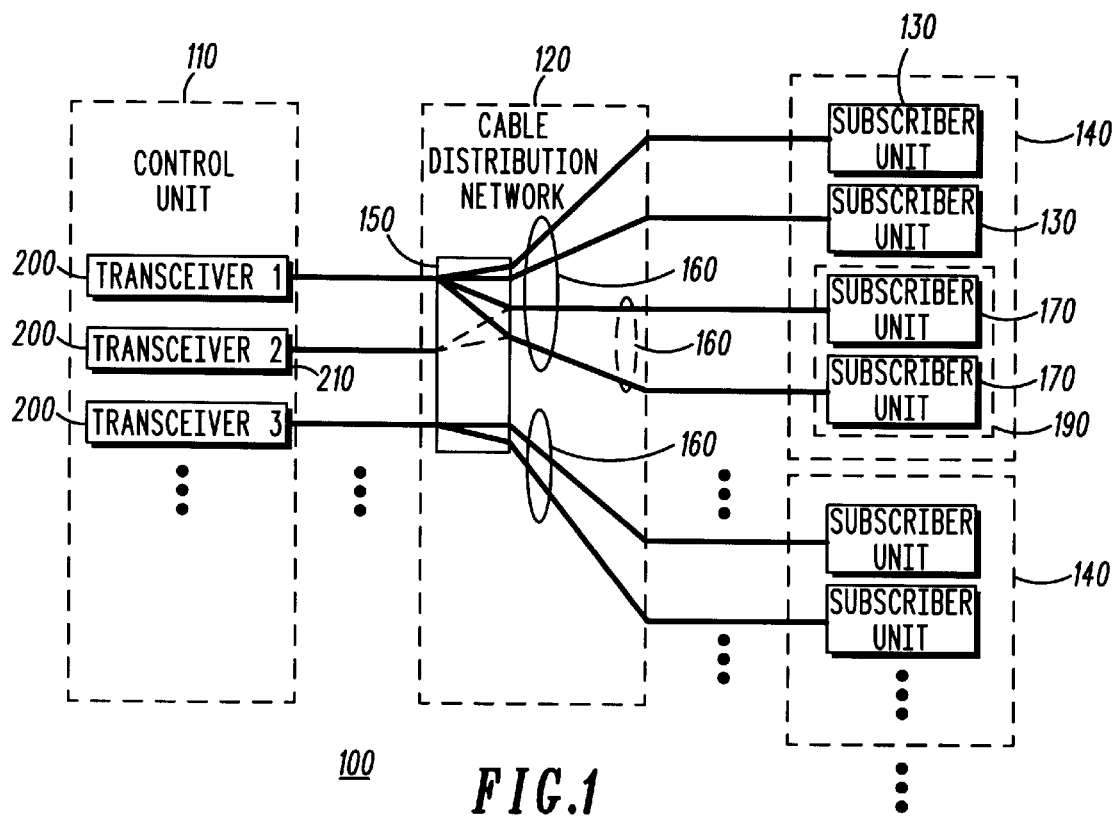
FIG. 1 is a schematic diagram of a communication system using cable infrastructure.

Generally, the present invention provides a method and apparatus for managing a cable communication system. By communicating with subscriber units and exchanging information regarding the method of communication, a control unit can effectively and efficiently control the communications occurring in the cable system.

As will be explained in detail below, the control unit sends messages containing operation parameters to the subscriber units. The control unit may send a broadcast message to all of the subscriber units or send operation parameters to only one subscriber unit. Some examples of the types of information that the control unit may send include information on security, authentication, and frequency bandwidth. The subscriber unit then responds to these operation parameters by modifying the manner in which it communicates with the rest of the cable system. For instance, the subscriber unit may use the security information to decode encrypted messages sent by the control unit. Also, for example, the subscriber unit may limit transmitting messages to only those frequencies described in the information on the frequency bandwidth.

Also, the subscriber unit may send messages to the control unit that may include information, for example, on the capabilities of the subscriber unit, how the subscriber unit is connected to the system, failures, or information on how the control unit may decode private messages sent by the subscriber unit.

Another important aspect of the invention is the ability to migrate subscriber units from one service area to another without disrupting service. Service migration may be necessary when the system is being expanded or contracted. By providing management and control capabilities of the communications in the cable system, this invention allows for the addition of subscriber units to the cable system without the disruption of service or the need for an operator at the subscriber unit locations.

For example, it is required, in certain circumstances, that subscriber units located in one service area use a path that is electrically isolated from other service areas. (i.e. use a different cable branch). When new subscriber units are added to the system, it is necessary to control the frequencies that are used by each of the subscriber units during the migration of subscriber units from one service are to another. In order to prevent the corruption of signals, the migrating subscriber unit must use mutually exclusive frequencies to the frequencies used by the non migrating subscriber units. The target transceiver, or in other words, the transceiver that will be servicing the migrating subscriber units is added in the electrically isolated branch and also uses the mutually exclusive frequencies to communicate. Essentially, there are two groups consisting of a transceiver and subscriber units utilizing the same branch at this intermediate step. After all the migrating subscriber units are instructed and are using the new frequencies, the two groups can be separated. Then, of course, the migration of subscriber units is complete without disruption of service. More than two groups can utilize the same branch as long as each group uses mutually exclusive frequencies from the frequencies the other groups are using.

A similar method may be implemented to combine service area groups. In this procedure, two separately operating groups of transceiver and subscriber units would be instructed to use mutually exclusive frequencies, then combined onto one branch. The subscriber units associated with a first transceiver are informed on the proper frequencies to communicate with the second transceiver. Eventually all subscriber units communicate with the second transceiver and the first transceiver can be disconnected from the branch and used elsewhere in the system. Various combinations and adaptations of these procedures can be used to efficiently manage the system.

The ability to communicate with the subscriber units also allows for the manufacturing of generic subscriber units that are essentially identical. Since the subscriber units can be configured remotely and downloaded with all the necessary information to communicate on the particular system through the cable, there is no need to configure the subscriber unit before installation. This is beneficial in at least two ways. First, the cost of manufacturing subscriber units can be kept at a minimum, since economies of volume can be achieved and the same test procedure can be used on all the subscriber units before leaving the manufacturing facility. Second, service providers can maintain a stock of subscriber units without the concern that certain subscriber units will not work on certain systems.

Referring now to the figures for a more detailed description of the invention, FIG. 1 is a schematic overview of cable communication system 100. A control unit 110 is connected by a cable distribution network 120 to the subscriber units 130. The control unit 110 serves to receive and actively route signals (i.e. information) throughout the communication system 100 as well as carry out other system administrative functions. In the preferred embodiment of the invention, the control unit 110 is comprised of several transceivers 200. The transceivers 200 consist of a transmitter and receiver. Although typically the same cable is utilized by both, the transmitter and receiver may be connected to different cables. The cable distribution network 120 is an arrangement and interconnection of cables that may consist of many cables, splitters, combiners, filters and amplifiers among other equipment needed to transmit and route signals to and from the control unit 110 and the subscriber units 130. The cable plant consist of hybrid fiber/coax (HFC) but can be any other suitable transmission medium, such as low-loss coaxial cable or fiber optic cable. The choice of the type of cable depends on the particular application and system requirements.

A typical cable system 100 may contain multiple control units 110 and subscriber units 130. The subscriber units are arranged into service area groups 140. The service area group 140 is a collection of subscriber units 130 that are connected on a branch 160 of cables that is electrically isolated from other branches 160. Although the criteria used to group subscriber units 130 into service area groups 140 is typically geographic location, subscriber units 130 may also be grouped together using other criteria such as the type of service required by the subscriber units 130. Subscriber units 130 that are moved from one service area group to another by connecting the subscriber unit 130 to another branch 160 are migrating subscriber units 170. The new service area that the migrating subscriber unit 170 moves to is the target service area 190. A detailed description of the subscriber unit migration will be discussed below in the detailed description of FIG. 5.

In the preferred embodiment of the invention, the cable distribution network 120 includes a radio frequency (RF) switching matrix 150 which connects the branches of cables 160 to the different transceivers 200 of the control unit 110. The RF switching matrix 150 can be electrically controlled to reconnect the branches 160 and transceivers 200 into a different arrangement.

Figure 2:
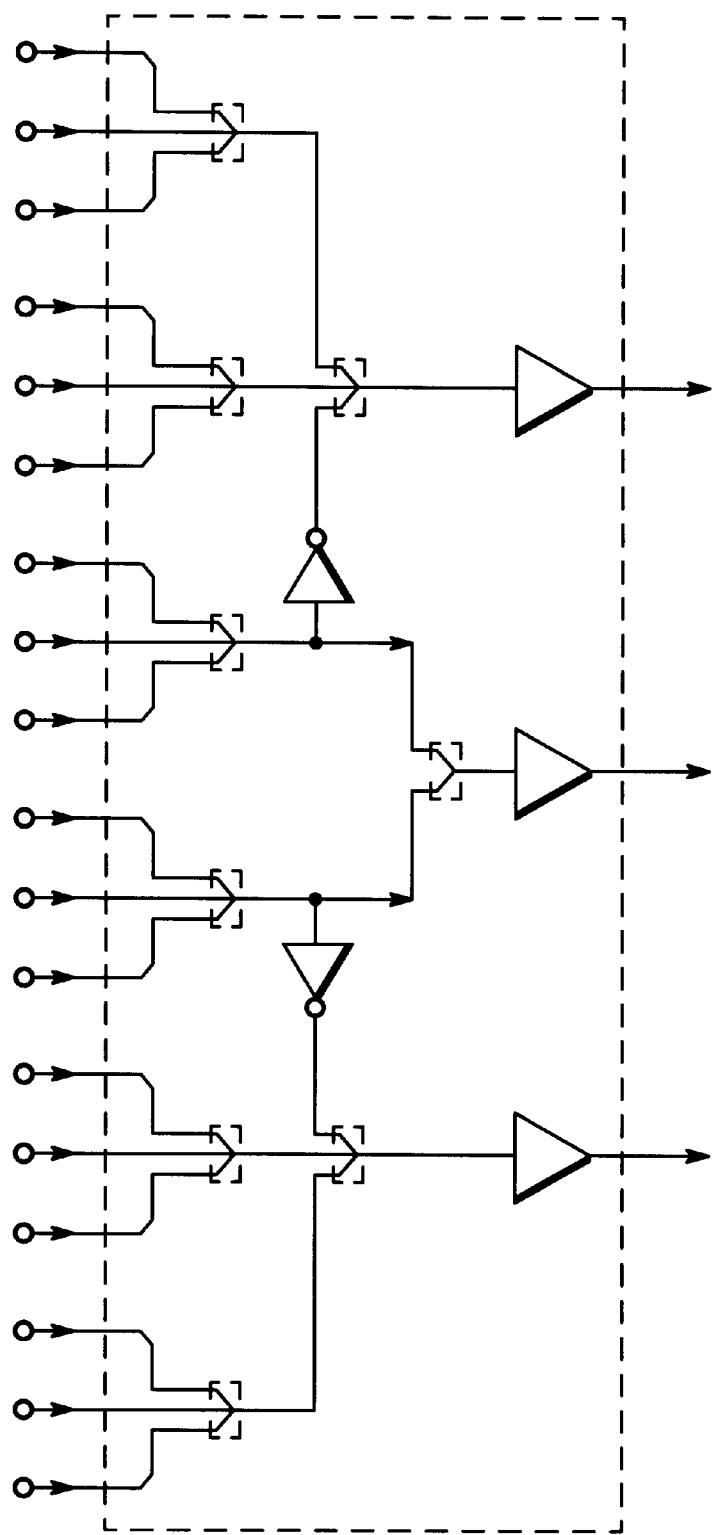
FIG. 2 is a schematic diagram of a transmit RF switch matrix.
Figure 3:
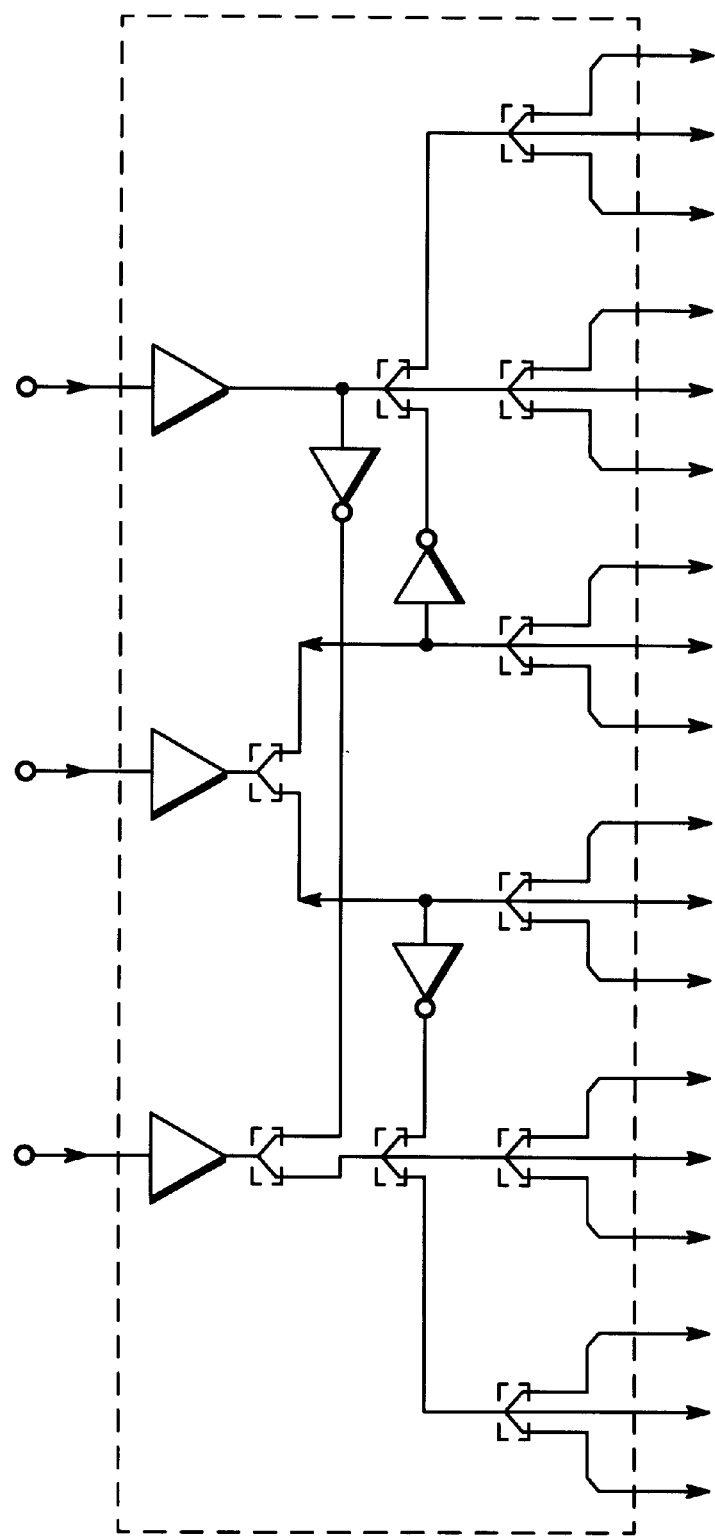
FIG. 3 is a schematic diagram of a receive RF switch matrix.

More detailed schematic drawings of RF switching matrices in accordance with the preferred embodiment are shown in FIG. 2 and FIG. 3. FIG. 2 is a detailed schematic drawing of a transmitter RF switching matrix and is an arrangement of switches, combiners and amplifiers. The RF switching matrix shown in FIG. 2 has three input ports and eighteen output ports. This allows for the configurations 3 groups of 6 transceivers 200, 2 groups of 9 transceivers 200 or 1 group of 18 transceivers 200 connected to 1, 2 or 3 service area groups 140.

Similarly, FIG. 3 is a schematic representation of a receiver RF matrix. This matrix is similar to the transmitter RF matrix in construction and functionality. The RF switching matrix shown in FIG. 3 has three input ports and eighteen output ports. This allows for the configurations 3 groups of 6 transceivers 200, 2 groups of 9 transceivers 200 or 1 group of 18 transceivers 200 connected to 1, 2 or 3 service area groups 140.

Figure 4:
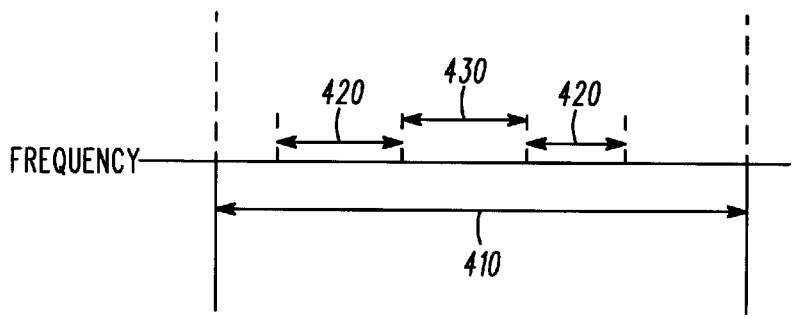
FIG. 4 is a graphical representation of frequency bandwidth.

FIG. 4 is a graphical representation of the relationship between the portions of frequency bandwidths of the cable communication system 100. The cable distribution network 120 operates over a frequency bandwidth 410 which is dictated by the particular communication system and physical limitations of the various components of the system. In the preferred embodiment of the invention, the frequency bandwidth 410 is divided into portions of frequency spectrum where one portion is used for downstream communications and the other portion is used for upstream communication. Downstream communication refers to the transmitted signals from the control unit 110 to the subscriber units 130. Upstream communication refers to the transmission of signals from the subscriber units 130 to the control unit 110.

In the preferred embodiment of the invention, the control unit 110 sends operation parameters. An operation parameter is any representation of information that can be utilized by the subscriber unit 130 for operation. In the preferred embodiment of the invention, the operation parameters are represented as multiple octet binary numbers. However, any representation that is suitable to a particular communication system may be used. The operation parameters include a frequency bandwidth parameter, a security identification parameter, a system channel parameter and a protocol parameter. Of course, other operation parameters may be used, including but not limited to a ringer indicator, service area parameter, service capability indicator, terminal assignment indicators history count indicator, authentication key, network authentication parameter, authentication parameter response indicator, and acknowledgments to any messages sent by the subscriber unit. Also, the operation parameters may be represented by many different message configurations in addition to those described here.

Briefly turning to FIG. 5, the frequency bandwidth parameter illustrated in FIG. 5 is a collection of several eight bit octets, where the information describing the frequency bandwidth is contained in octets three through five. This frequency bandwidth description, when interpreted by the subscriber unit 130, communicates to the subscriber unit 130 what frequencies should be used for transmitting and receiving. Turning back to FIG. 4, the frequency bandwidth 410 may be split to lower and upper portions of bandwidth with each being used exclusively for transmission or reception. However, the portions of bandwidth 420 do not need to be continuous and may be arranged as a plurality of portions of frequency bandwidth, as shown in FIG. 4., and may contain sections of frequency spectrum 430 between the portions of frequency bandwidth 420.

Referring to FIG. 6, the control unit may also send a security identification parameter 600 which is used by the subscriber unit 130 to decode encrypted messages sent by the control unit 110. The structure and contents of the security identification parameter 600 depends on the type of security protocols used in the communication system and the particular subscriber unit 130. The security protocols utilized by the communication system are in accordance with those known in the art such as Diffie-Hellman, RSA or CAVE.

In the preferred embodiment of the invention, the subscriber unit 130 sends messages to the control unit. The messages include system and subscriber unit information. The subscriber unit 130 may also inform the control unit 110 of the subscriber unit's capabilities by sending subscriber information in a message. The subscriber information includes information on how the subscriber unit is configured, the subscriber unit serial number, what cables are attached to the subscriber unit, or any other information the control unit can utilize to manage the communication system more efficiently and the subscriber unit is able to detect or is able to retrieve from memory. Information such as an electronic serial number (EN), a Common Language Equipment Identifier (CLEI), and information on manufactured capabilities are typically loaded into read only memory during the manufacturing of the subscriber unit. The subscriber unit may also store information such as the authentication parameter, service provider and service area information, and an active code blank into non-volatile memory.

Circuitry may be incorporated into the subscriber unit to sense for customer premise equipment. This information may either be sent immediately to the control unit or stored into memory and retrieved and sent at a later time. The information that may be sent by the subscriber unit 130 includes, but is not limited to, an authentication parameter, an electronic serial number (EN), a security menu selection, a registration flag, a service capability indicator, a terminal descriptor, a common language equipment identifier, a history count mask, an authentication mask, and a version parameter.

Figure 7:
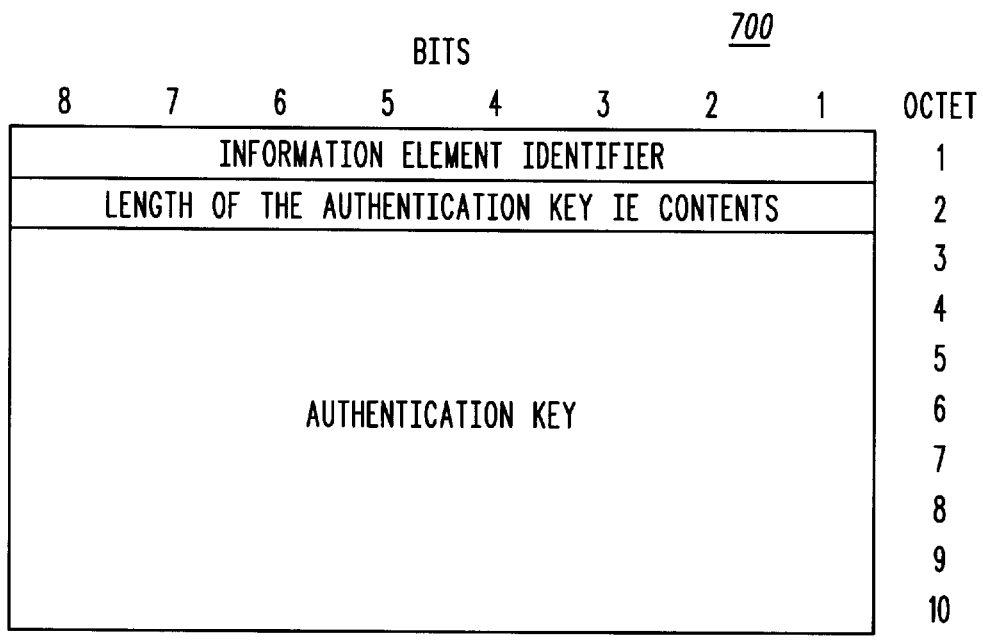
FIG. 7 is a block diagram of a authentication parameter.

A block diagram of an authentication parameter 700 is depicted in FIG. 7. The subscriber unit 130 sends an authentication parameter 700 to the control unit 110. The authentication parameter 700 contains information that is used by the control unit 110 to authenticate private messages sent by the subscriber unit 130. A private message is one that is only intended to be understood by a limited number of subscriber units 130 and control unit 110 or only the control unit 110. Preferably a private message is only intended to be understood by the control unit 110 managing the subscriber unit 130 that sent the message. The structure and contents of the authentication parameter also depends on the communication system 100 and the security protocols used in the communication system 100. Again, the protocols that the communication system 100 may use are in accordance with those known in the art such as RSA, Diffie-Hellman or CAVE.

Figure 8:
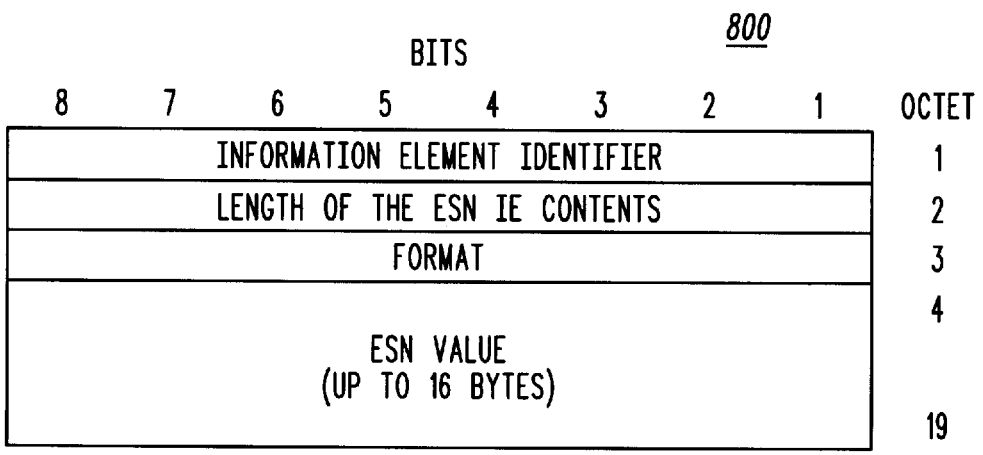
FIG. 8 is a block diagram of an electronic serial number.

An electronic serial number 800 is depicted in FIG. 8. the subscriber unit may inform the control unit of the subscriber unit's identity by sending an electronic serial number 800. In the preferred embodiment of the invention the electronic serial number is represented by a maximum of 19 octets with the first three octets representing information for identifying the message, the length of the message, and the format of the message. Alternate known representations and structures of the electronic serial number may be used that are compatible with the particular communication system.

The ability to send operation parameters and receive subscriber information, as described above, allows the control unit 110 to efficiently manage the communication system 100. One way the control unit 110 manages the system is to migrate subscriber units 170 from one service area to another. This procedure may be performed for various reasons including regrouping the subscriber units in order to efficiently utilize system resources or regrouping subscriber units in order continue service if a failure has occurred.

Figure 9:
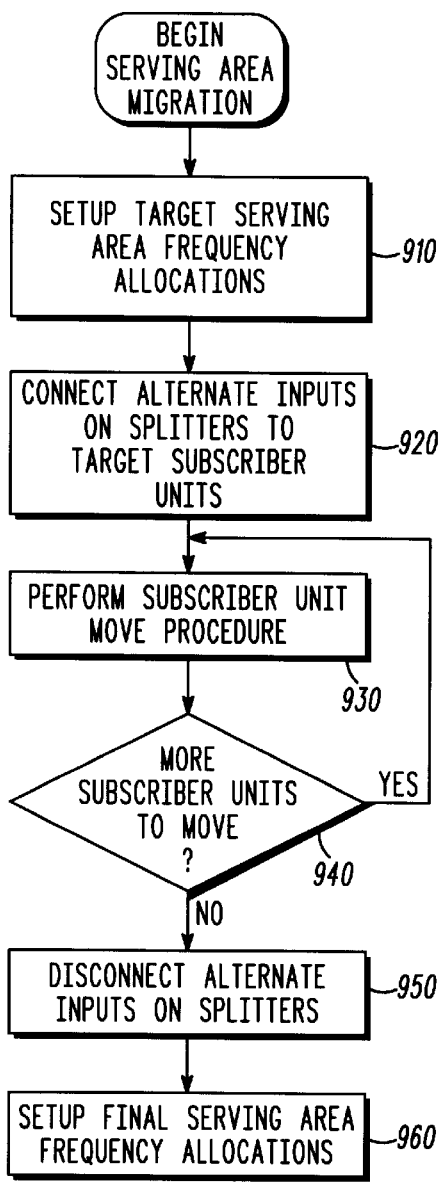
FIG. 9 is a flow chart representing the migration of subscriber units procedure.

A flow chart representing the procedure for migrating subscriber units 170 in accordance with the preferred embodiment of the invention is depicted in FIG. 9 (explained with reference to the physical components of the system shown in FIG. 1). At step 910, the control unit sets up the target serving area 190 frequency allocations by broadcasting a message containing a frequency bandwidth parameter 500 (FIG. 5) and information identifying which subscriber units 170 will be migrating. The migrating subscriber units 170 then only use the frequency bandwidths that are in accordance with the message sent by the control unit. The control unit 110 chooses the frequencies such that the migrating subscriber units 170 use frequencies that are mutually exclusive to those frequencies used by the other subscriber units 130 connected on the same branch 160. At step 920, the target transceiver 210 that will be servicing the target service area 190 is electrically connected to the same branch 160. This step is typically performed by the RF switching matrix 150, but could also be accomplished with the use of external combiners.

Figure 10:
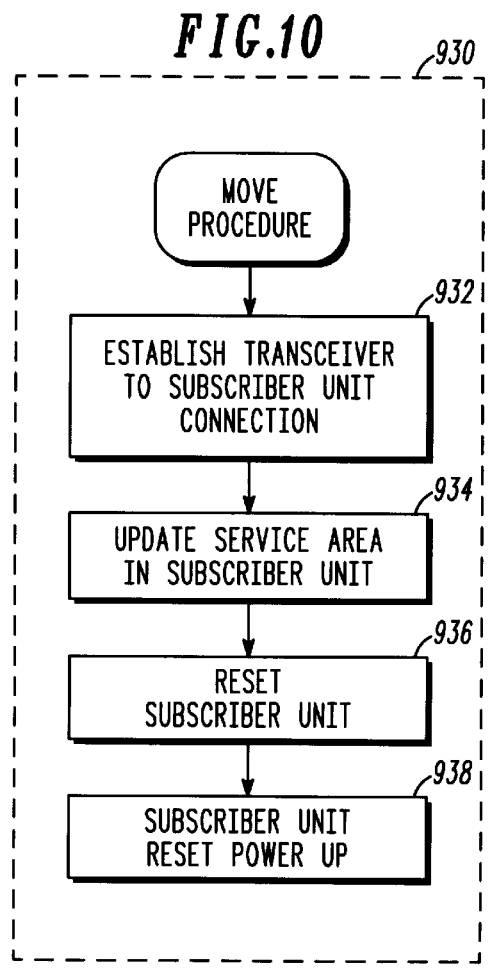
FIG. 10 is a flow chart of the details of a step in the process illustrated in FIG. 9.

Each migrating subscriber unit 170 is logically moved to the target service area 190 in step 930. Details of the step 930 are illustrated by the flow chart of FIG. 10. The moving procedure of step 930 begins by first establishing a communication between the target transceiver 210 and the moving subscriber unit at step 932. At step 934, the information pertaining to service area is updated in the migrating subscriber unit. This step is performed by sending a message from the control unit to the migrating subscriber unit which contains the service area parameter. The subscriber unit then updates the service area parameter by writing over the old value in non-volatile memory. At step 936, the control unit sends a message to the migrating subscriber unit that informs the subscriber unit to reset by performing a power up sequence. At step 938, the subscriber unit then performs the powerup sequence by using the values in non-volatile memory. Since these values correspond to the target service area, the subscriber unit has been logically moved at this point. At step 930, no physical connection has changed, the physical service area group 140 is still the same. However, after the migrating subscriber unit is moved at step 930 the migrating subscriber unit 170 operates as if it is connected in the target service area group 190.

The control unit 110, at step 940, determines if more subscriber units 130 must be logically moved to the target service area group 190. If so, step 940 is repeated and if no more subscriber units need to be moved then the procedure continues to step 950.

At step 950, the target transceiver 210 and the migrating subscriber units 170 are disconnected from the other subscriber units 130 and transceiver 200. This can be done by reconfiguring the RF switching matrix 150 or, if an external combiner was used in connecting the target transceiver 210, removing the combiner and making a direct connection between the target transceiver 210 and the migrating subscriber units 170. This results in the target transceiver 210 and the migrating subscriber units 170 being electrically isolated from the other subscriber units 130. Therefore, the target service area group 190 is established.

At step 960, the subscriber units 130 and the migrating subscriber units 170 no longer are required to use mutually exclusive frequency bandwidths. Therefore, at step 960, the subscriber units are sent new frequency bandwidth parameters so more of the frequency bandwidth 410 may be utilized.

Figure 11:
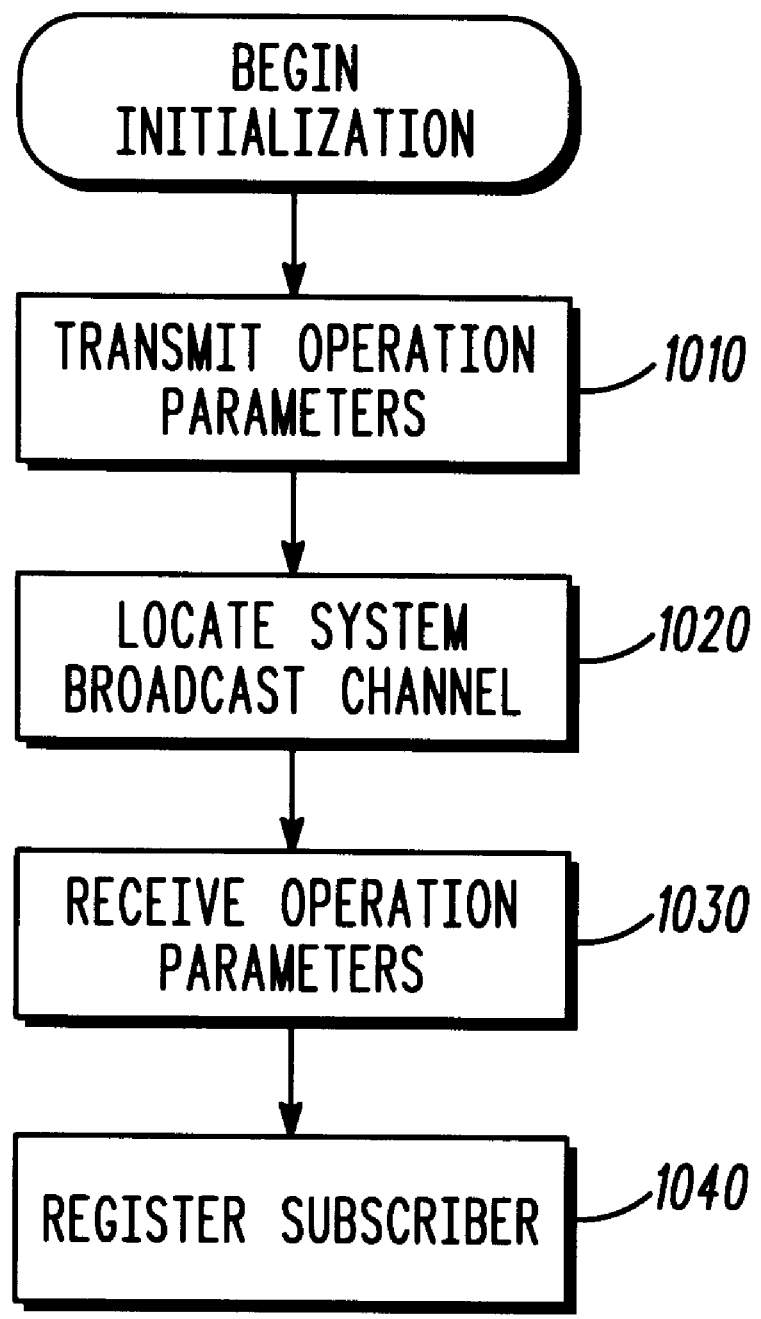
FIG. 11 is a flow chart representing the subscriber initialization procedure.

A representation of an alternate embodiment of the invention, which is a method for initializing a subscriber unit, is depicted in FIG. 11. In step 1010, the control unit 110 transmits operation parameters on the system broadcast channel. The system broadcast channel is used to broadcast system information from the control unit 110 to the subscriber units 130. At step 1020, the subscriber unit scans for and locates the system broadcast channel containing the operation parameters. At step 1030, the subscriber unit receives and decodes, if necessary, the operation parameters. With the acquired system information, the subscriber unit can properly register on the system at step 1040.

Consequently, a communication system and method for managing the communication system has been disclosed which provides for flexible management by communicating operating parameters to and from subscriber units. It will be understood that many other system configurations may be envisioned without departing from the scope the invention as defined by the following claims.

What is claimed is:

1. In a communication system comprising a plurality of subscriber units, a control unit connected to the plurality of subscriber units via a cable distribution network having a frequency bandwidth, the plurality of subscriber units connected in an arrangement of service area groups, a method of service migration comprising the steps of:

transmitting operation parameters from the control unit to a migrating subscriber unit;

receiving the operation parameters in the migrating subscriber unit;

modifying communications in accordance with the operation parameters; and changing the arrangement of the service area groups by connecting the migrating subscriber unit to a new service area group.

2. The method of claim 1 where the operation parameters include a frequency bandwidth parameter which identifies at least one portion of the frequency bandwidth; and the step of modifying communications includes limiting communication to the at least one portion of the frequency bandwidth.

3. The method of claim 2 wherein the at least one portion of frequency bandwidth includes a plurality of portions of frequency bandwidth separated by frequency spectrum.

4. The method of claim 1 where the step of changing the arrangement of the service area groups by connecting the migrating subscriber unit to a new service area group is accomplished by reconfiguring a programmable radio frequency switch matrix.

* * * * *